United States Patent
Fleming, III

(10) Patent No.: US 6,230,204 B1
(45) Date of Patent: *May 8, 2001

(54) METHOD AND SYSTEM FOR ESTIMATING USAGE OF COMPUTER RESOURCES

(75) Inventor: Hoyt A. Fleming, III, Boise, ID (US)

(73) Assignee: Micron Electronics, Inc., Nampa, ID (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/994,836

(22) Filed: Dec. 19, 1997

(51) Int. Cl.[7] .................................................. G06F 15/16
(52) U.S. Cl. ........................................... 709/229; 709/224
(58) Field of Search ................................... 709/229, 218, 709/226, 224; 705/10; 380/49; 345/327; 379/92.01

(56) References Cited

U.S. PATENT DOCUMENTS

| | | | |
|---|---|---|---|
| 4,977,594 | 12/1990 | Shear | 380/4 |
| 5,247,517 | 9/1993 | Ross et al. | 370/85.5 |
| 5,315,580 | 5/1994 | Phaal | 370/13 |
| 5,627,886 | 5/1997 | Bowman | 379/111 |
| 5,638,443 | 6/1997 | Stefik et al. | 380/4 |
| 5,675,510 | 10/1997 | Coffey et al. | 364/514 A |
| 5,682,525 | 10/1997 | Bouve et al. | 395/615 |
| 5,706,502 | 1/1998 | Foley et al. | 395/610 |
| 5,708,780 | 1/1998 | Levergood et al. | 395/200.12 |
| 5,710,918 | 1/1998 | Lagarde et al. | 395/610 |
| 5,715,453 | 2/1998 | Stewart | 395/615 |
| 5,787,253 | 7/1998 | McCreery et al. | 395/200.61 |
| 5,796,952 | 8/1998 | Davis et al. | 395/200.54 |
| 5,812,642 * | 9/1998 | Leroy | 379/92.01 |
| 5,819,047 * | 5/1999 | Bauer et al. | 709/229 |
| 5,835,087 * | 11/1998 | Herz et al. | 345/327 |
| 5,848,396 * | 12/1998 | Gerace | 705/10 |
| 5,872,850 * | 2/1999 | Klein et al. | 380/49 |
| 5,901,287 * | 5/1999 | Bull et al. | 709/218 |
| 5,943,480 * | 8/1999 | Neidhardt | 709/226 |
| 6,101,540 * | 8/2000 | Graf | 709/224 |
| 6,148,335 * | 11/2000 | Haggard et al. | 709/224 |

OTHER PUBLICATIONS

Nielson Report of Internet and Web Use, "Nielson Report." http://www.olms.com/nielson.html, Dec. 1995, (visited Mar. 18, 1998).

* cited by examiner

Primary Examiner—Robert B. Harrell
Assistant Examiner—Thong Vu
(74) Attorney, Agent, or Firm—Dorsey & Whitney LLP

(57) ABSTRACT

A system for estimating the total usage of computer system resources by all users with access to those resources, performed in such a way that desired demographic information is available and computer users are not deterred from using the resource by the usage estimation techniques. The system selects a computer system resource of interest, receives demographic information on various computer users with access to the resource, uses the demographic information to select some of the computer users to be a representative sample of all computer users with access to the resource, loads a copy of a monitoring program onto each of the computer systems used by the selected users, executes the loaded copies of the monitoring program so that usage of various computer system resources by the selected users is recorded, transfers the recorded information to a central analyzing facility, estimates the total usage of the computer system resource of interest by all the users based on the usage of the representative sample users, and rates the resource relative to other resources based on a resource characteristic that depends on the amount of usage. In one embodiment, the computer system resource of interest is a computer document or a computer website on the World Wide Web, and the document or website includes advertising information that is displayed when the resource is accessed and used. In this embodiment, the document or website is rated on the basis of its ability to attract computer users with demographic information of interest.

34 Claims, 8 Drawing Sheets

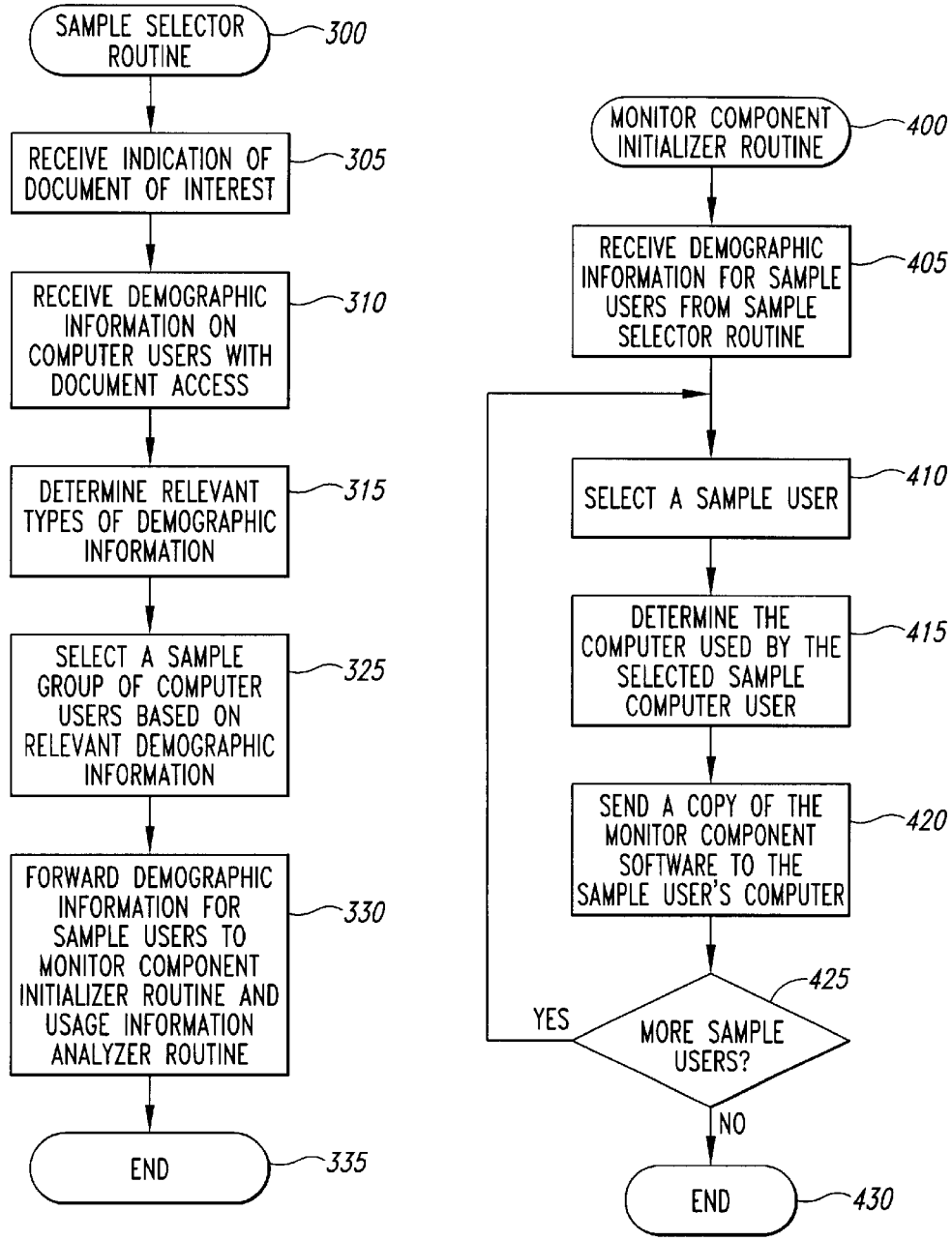

| RESOURCES ACCESSED | COMBINED USAGE INFORMATION | USER INFORMATION |
|---|---|---|
| DOCUMENT ⟋1010<br>PRESIDENT CLINTON ANNOUNCES NEW STANDARDS TODAY, PRESIDENT CLINTON ANNOUNCED NEW STANDARDS FOR EDUCATIONAL TESTING. WHILE LOCAL TEACHERS WERE SKEPTICAL, PRESIDENT CLINTON INSISTED THAT THE CURRENT *EDUCATIONAL SYSTEM* WAS BROKEN, AND NEEDED TO BE FIXED....<br><SELECT HERE TO SEE PRESS PHOTO> | USAGE INFORMATION ⟋1020<br>8/17<br>10:50-11:30  OPEN;VIEW;CLOSE<br>8:30-8:55   OPEN;VIEW;CLOSE<br><br>8/18<br>2:15-2:25   OPEN;VIEW;CLOSE<br><br>8/19<br>4:05-5:35   OPEN;VIEW;CLOSE<br>4:30-4:45   OPEN;VIEW;CLOSE<br>8:10-8:35   OPEN;<br>            DISPLAY IMAGE;<br>            CLOSE | USER LIST ⟋1030<br>USER 1<br>USER 2<br><br><br>USER 4<br><br><br>USER 1<br>USER 2<br>USER 3 |
| PROGRAM ⟋1040<br>DUNE BUGGY RACER | USAGE INFORMATION ⟋1050<br>8/17<br>9:30-10:45   EXECUTE | USER LIST ⟋1060<br>USER 3 |

TOTAL RESOURCE USAGE BY ALL USERS WITH ACCESS

TOTAL USAGE ESTIMATION ⟋1070

| DOCUMENT 10 | VIEW (MINUTES) | | DISPLAY IMAGE (MINUTES) | | EXECUTE (MINUTES) | |
|---|---|---|---|---|---|---|
| | ACTUAL | EXTRAPOLATED | ACTUAL | EXTRAPOLATED | ACTUAL | EXTRAPOLATED |
| USER 1 | 130 | 260 | 0 | 0 | 0 | 0 |
| USER 2 | 25 | 25 | 2 | 100 | 0 | 0 |
| USER 3 | 15 | 5 | 0 | 10 | 0 | 0 |
| TOTAL | 170 | 290 | 2 | 110 | 0 | 0 |

| PROGRAM 40 | VIEW (MINUTES) | | MODIFY (MINUTES) | | EXECUTE (MINUTES) | |
|---|---|---|---|---|---|---|
| | ACTUAL | EXTRAPOLATED | ACTUAL | EXTRAPOLATED | ACTUAL | EXTRAPOLATED |
| USER 1 | 0 | 0 | 0 | 0 | 0 | 0 |
| USER 2 | 0 | 0 | 0 | 0 | 0 | 25 |
| USER 3 | 0 | 0 | 0 | 0 | 75 | 150 |
| TOTAL | 0 | 0 | 0 | 0 | 75 | 175 |

*Fig. 10*

METHOD AND SYSTEM FOR ESTIMATING USAGE OF COMPUTER RESOURCES

TECHNICAL FIELD

The present invention relates generally to monitoring usage of computer system resources and more particularly to estimating the usage of computer system resources by all users with access to those resources.

BACKGROUND OF THE INVENTION

In the past, personal computer systems worked as stand-alone units, and a computer system was used by a single user at a time. In this situation, it was relatively easy to monitor the total usage of various computer system resources (e.g., the display, or a file or document located on the hard disk) because a computer system can typically monitor the activities of its own users. However, as computers have become increasingly interconnected through computer networks, a user of one computer system has gained the ability to access and use resources on another computer system, and multiple computer users can often use a single resource at the same time. For example, multiple users can download the same file to their local computer systems from a remote computer system, and access the file simultaneously. As the World Wide Web (WWW) has become increasingly popular, a computer file or webpage on a single computer has become accessible to millions of users.

If a computer system's resource is being accessed by users of other computer systems, it can be difficult for the computer system providing the resource to accurately measure the usage of its resource because a computer system cannot typically monitor the activities of users of other computer systems. For example, the remote computer system providing a file may not be able to determine details such as the total number of different users that have viewed the file (because a single user could repeatedly view the file, or a single user could make copies of the file and provide these copies to other users), the total amount of time that the file has been viewed, or any personal information about the specific users that have viewed the file. If the computer system cannot detect all of the usage activities of various users from other computer systems who can use a computer system resource, it cannot measure the total usage of the resource.

It is useful to know the total usage of a computer system resource for a variety of reasons. For example, it is often useful to know the total load (i.e., the total amount of work being requested) for a resource or for a device providing a resource. If a particular file is being accessed by too many users at the same time, then the ability of the computer system or resource to provide a prompt response to user requests is hindered. If the problem is identified, however, steps can typically be taken to adjust the load and provide better response to users.

In addition to monitoring loads, the total usage of a computer system resource is important for a resource with an attribute or characteristic related to usage. For example, a fee can be charged based on the usage of a computer system resource, such as a file or executable computer program that is leased on a per-use basis (e.g., 10¢ per minute while the program is in use). Similarly, advertisers typically pay rates for advertisements based on factors related to the number and type of people viewing the advertisement and the total amount of time that the advertisement is viewed. Thus, if an advertisement were attached to or associated with a file being viewed by users, the time spent viewing the file would be an important attribute related to usage. However, if the only usage information that can be detected for a file is the total number of times that the file is accessed and viewed, this information would be insufficient for a file owner who wishes to base viewing charges on the total amount of time that the file is viewed, or wishes to sell advertising space within the file based upon the total number of users who have accessed the file for a total amount of time. In the case of advertisers, it is particularly important to have access to demographic information about the users (ie., age, sex, race, religion, occupation, income, hobbies, etc.), because advertisers typically wish to target their advertisement to particular subgroups of the general population. As a result, various methods have been developed to rate different advertising media on the basis of their ability to attract viewers with desired demographic information.

Existing methods to track total usage of computer system resources suffer from various drawbacks. As described above, when a computer system tries to track usage of a resource it has provided (e.g., the number of times that a provided file is accessed), the computer system cannot typically measure as much usage information as is needed. Another method of estimating total usage information involves surveying a representative sample group of users by asking them to manually record information about their usage activities. The information from the sample users is then extrapolated to cover the larger group of all users who have access to the computer resource, thus providing an estimate of the total usage by all users. However, this method lacks a reliable mechanism for verifying the accuracy of the data recorded by the users, and is too time-consuming for many users to participate.

When the usage information that is desired involves activities other than merely viewing information, the problems with determining the total usage of a resource are compounded. Webpages (i.e., WWW documents, often part of a larger website) often provide more than a static display of information, such as the inclusion of textual information that can be modified, audio or video information that can be downloaded and/or played, images that can be viewed or manipulated, programs that can be executed, options that can be selected, information that can be selected and viewed in greater detail, etc. Thus, the usage activities associated with such files have become increasingly diverse, and traditional methods of resource usage estimation have increasing difficulty in monitoring this variety of usage activities.

SUMMARY OF THE INVENTION

Some embodiments of the present invention provide a method and system for estimating the total usage of computer system resources by all users with access to those resources, performed in such a way that desired demographic information is obtained and the usage estimation techniques do not deter computer users from using the resource. The system first selects a computer system resource of interest and receives demographic information on various computer users with access to the resource. The system then uses the demographic information to select some of the computer users to be a representative sample of all computer users with access to the resource. The system initiates monitoring of the sample users' usage activities by loading a copy of a monitoring program onto each of their computer systems so that the loaded copies execute when the user is using computer system resources. The executing monitoring programs record usage of resources by the selected users, and periodically transfer the recorded information to a central analyzing facility. The analyzing facility then uses the recorded usage information from the sample users and their demographic information to estimate the total usage of the resource by all users with access to it. In addition, the analyzing facility rates the usage of the resource relative to the usage of other resources.

In one embodiment, the computer system resource of interest is a computer document or a computer website on the World Wide Web, and the document or website includes advertising information that is displayed when the resource is accessed and used. In this embodiment, the document or website can be rated on the basis of its ability to attract computer users with demographic information of interest.

BRIEF DESCRIPTION OF THE DRAWINGS

FIG. 3 is a flow diagram of a possible implementation of a Sample Selector routine.

FIG. 4 is a flow diagram of a possible implementation of a Monitor Component Initializer routine.

FIG. 10 is a diagram illustrating examples of resources that are accessed, usage information for these resources, and an estimation of the total usage of these resources by all users with access to them.

DETAILED DESCRIPTION OF THE INVENTION

An embodiment of the present invention provides a method and system for estimating the total usage of computer system resources by users with access to those resources, with the estimation performed in such a way that desired demographic information about the users is available and the usage estimation techniques do not deter computer users from using the resource. In particular, a Resource Usage Rater (RUR) system first identifies a computer system resource of interest, such as a computer document accessible via the World Wide Web (WWW), and receives demographic information on various computer users with access to the resource. The RUR system uses the demographic information to select a group of computer users to be a representative sample of all computer users with access to the computer resource. The RUR system then initiates monitoring of the sample users' resource usage activities by loading a copy of a monitoring program onto the computer systems used by the sample users, so that the loaded copies can execute when the user is using computer system resources. The executing monitoring programs record usage of resources by the sample users, and periodically transfer the recorded information to a central analyzing facility. The analyzing facility then uses the recorded usage information from the sample users and their demographic information to estimate the total usage of the resource by all users. Finally, the analyzing facility may rate the resource relative to other resources, based on their respective usages or on a characteristic of the resources that depends on the amount of usage.

Figure 1:
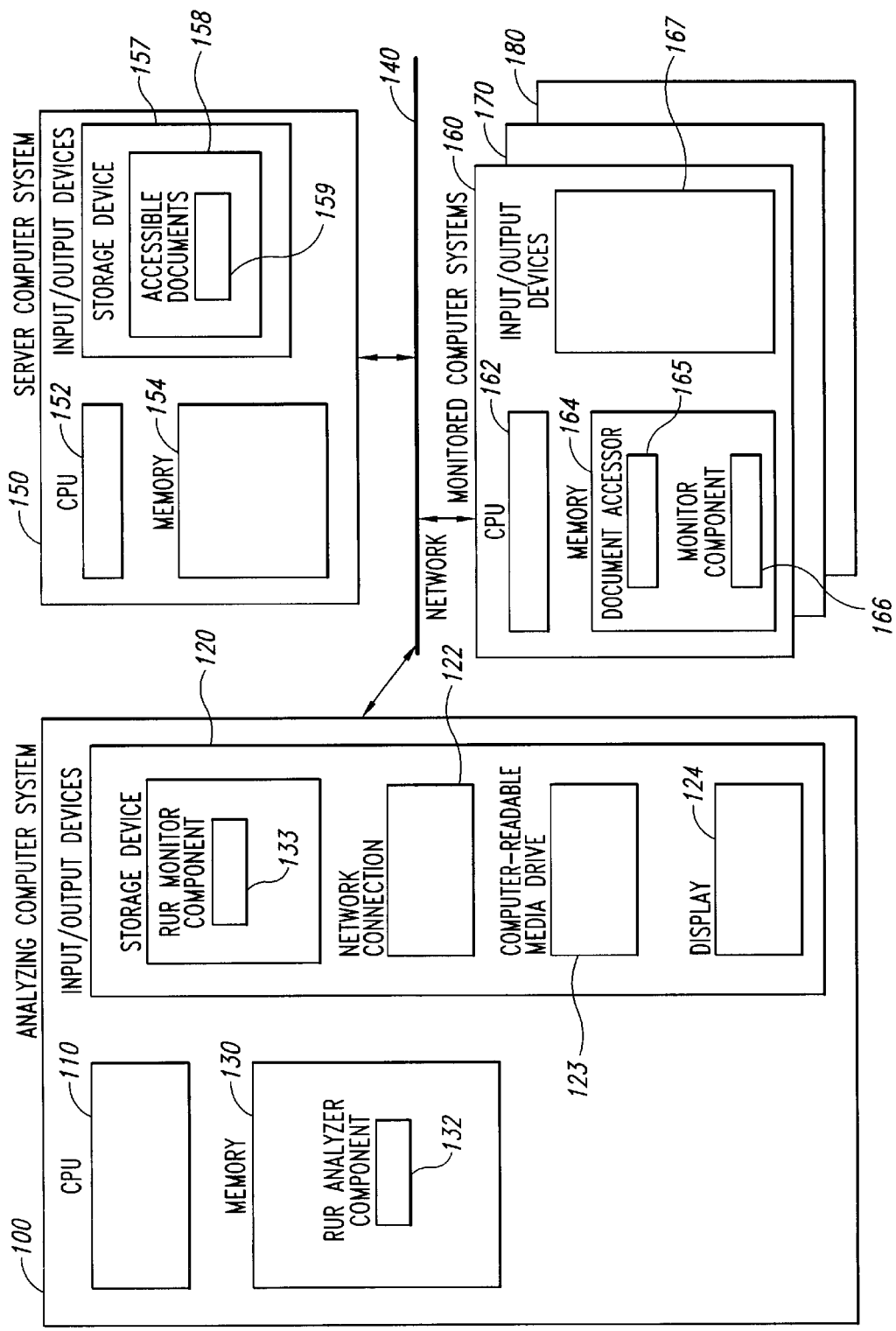
FIG. 1 is a block diagram illustrating components of an embodiment of the present invention.

FIG. 1 illustrates an analyzing computer system 100 suitable for executing the Resource Usage Rater (RUR) system. In addition, FIG. 1 illustrates computer systems 150, 160, 170, 180 and network 140. Analyzing computer system 100 includes a CPU 110, input/output devices 120, and a memory 130. The input/output devices 120 include a storage device 121, a network connection 122, a computer-readable media drive 123, and a display 124. Computer-readable media include not only memories such as RAM and ROM, but also transportable media that can be accessed with a drive such as disks, CD-ROMs, tapes, etc. The RUR system comprises the Analyzer Component 132 executing in the memory 130, and the Monitor Component 133 stored on the storage device 121.

As the Analyzer Component 132 executes on a computer system, it receives an indication of a computer system resource of interest and information about various computer users with access to the resource. The input can come from a variety of sources, including a human operator. The resource can be located on analyzing computer system 100 (e.g., the computer-readable media drive 123) or on another computer system. In the illustrated embodiment, the resources of interest are computer documents, such as webpages or other documents on the World Wide Web (WWW), that are accessible to various computer users. A computer document comprises related information which is grouped together, and such a document may be stored in a variety of ways, including as a single computer file, a portion of a file, portions of multiple files, or one or more database entries.

After receiving computer user information, the Analyzer Component 132 selects a representative sample of the computer users based on the information. In this example, the Analyzer Component 132 selects the users of monitored computer systems 160, 170 and 180 to be sample users. After selecting the sample users, the Analyzer Component 132 then downloads a copy of the Monitor Component 133 program to the computer systems of the selected sample users. When executed, the Monitor Component 133 programs will monitor the usage of resources by the sample users. These Monitor Component copies can be downloaded directly into memory of the computer systems, or they can be initially stored on a non-volatile storage device on the computer system. If the copies are loaded directly into memory, they can be immediately executed or they can be stored as data in memory until execution time arrives.

Server computer system 150 provides other computer systems with access to documents, and it comprises a CPU 152, a memory 154, and input/output devices 157. The input/output devices 157 include a storage device 158, which contains accessible documents 159. The accessible documents 159 (e.g., webpages) are accessible to all displayed computer systems via network 140, including monitored computer systems 160, 170 and 180. For purposes of the illustrative example, the accessible documents 159 are resources of interest whose total usage will be estimated.

Monitored computer system 160 comprises a CPU 162, input/output devices 167, and a memory 164. Monitored computer system 160 can act as a client computer system that accesses documents provided by a server computer system, such as server computer system 150. The memory 164 includes an executing document accessor 165, and an executing Monitor Component 166 which has been downloaded by the Analyzer Component 132. The executing document accessor 165 is used by the user of monitored computer system 160 to interact with the accessible documents 159, and can additionally be used to interact with other documents located on monitored computer system 160 or on some other computer system. Those skilled in the art will appreciate that a variety of types of programs can serve as an executing document accessor, such as a word processing program, a WWW browser, or a media player program. If the Monitor Component 166 is not executed immediately upon being loaded onto monitored computer system 160, it begins to execute when the document accessor 165 begins executing or begins accessing documents. In one embodiment, the Monitor Component 166 monitors all documents that are accessed and interacted with by the user of monitored computer system 160, whether the documents accessed are the accessible documents 159 or other documents. In another embodiment, the Monitor Component 166 may monitor only the usage of accessible documents 159.

Monitoring of document usage can be accomplished in a variety of ways. When accessed, a copy of a document is typically loaded into the memory of the accessing computer. Types of user interactions with accessed documents include viewing the document, modifying the document, downloading and/or playing audio or video clips that are included or referenced in the document, executing a program that is included in the document, viewing an image that is s included in the document, selecting information that is included in the document contents, entering information into their computer system at the direction of the document, transmitting information to another computer in response to document contents, etc. Those skilled in the art will appreciate that other resources can be accessed, and that other types of user interactions are possible.

Since user interaction with a computer is accomplished through the use of input devices, those devices can be monitored to detect interactions. In addition, some changes to the computer's physical configuration can typically be detected (e.g., inserting a floppy disk in a drive). Once user interactions are detected, those which interact with a resource can be detected in a variety of ways. For example, a user could begin a period of access with a document by typing its name, by selecting an inactive (i.e., previously accessed and still open) window, or by modifying an inactive document. Similarly, scrolling the window in which a document is currently displayed, selecting a portion of the document contents, or adding contents to a document can indicate continued interaction with a document and are thus related to document access. Alternately, a computer user may interact with the computer but not access a computer document, such as when the user is entering a password or performing a backup of a storage device.

After monitoring and collecting document usage information, the Monitor Component 166 occasionally transmits this monitored information back to an Analyzer Component on an analyzing computer system. In the illustrated embodiment, the Monitor Components transmit their information to the Analyzer Component 132. In other embodiments, multiple Analyzer Components could be executing on multiple computer systems, with each Analyzer Component receiving some transmitted usage information.

When the Analyzer Component 132 receives monitored resource usage information from a Monitor Component (representing a particular sample user), the Analyzer Component 132 combines this usage information with the usage information received for other sample users. The Analyzer Component 132 uses the combined usage information from the sample users and the sample users'demographic information to estimate the total usage of the accessible documents 159 by all users with access to them. The estimated total resource usage information from an Analyzer Component can be used to rate computer system resources, and this resource rating information is made available by the RUR system to other components. For example, the accessible documents 159 could be rated on their ability to attract women viewers age 18–25 to view them. Moreover, the documents could be rated on an absolute scale or on a scale relative to other computer documents or other advertising media. If the usage of the resource is rated relative to the usage of other resources or advertising media, the Analyzer Component 132 can obtain usage information for the other resources or advertising media by monitoring the usage of the other resources or by receiving their usage information as input. A more detailed example will be discussed later related to selecting sample users, monitoring their usage activities, and estimating the total usage of resources of interest.

Monitored computer systems 170 and 180 have the same types of components with corresponding numbers to those of monitored computer system 160, and are not displayed for the sake of brevity. Those skilled in the art will appreciate that the computer systems displayed are merely illustrative and the various computer systems may include additional components or may lack certain illustrated components. For example, a computer system can include multiple CPUs, and multiple separate computers can function together as a computer system. In addition, a component such as the accessible documents 159 could be located on a computer system other than server computer system 150, and one or more of the computer users that are using monitored computer systems 160–180 could instead be using computer systems 100 or 150.

Figure 2:
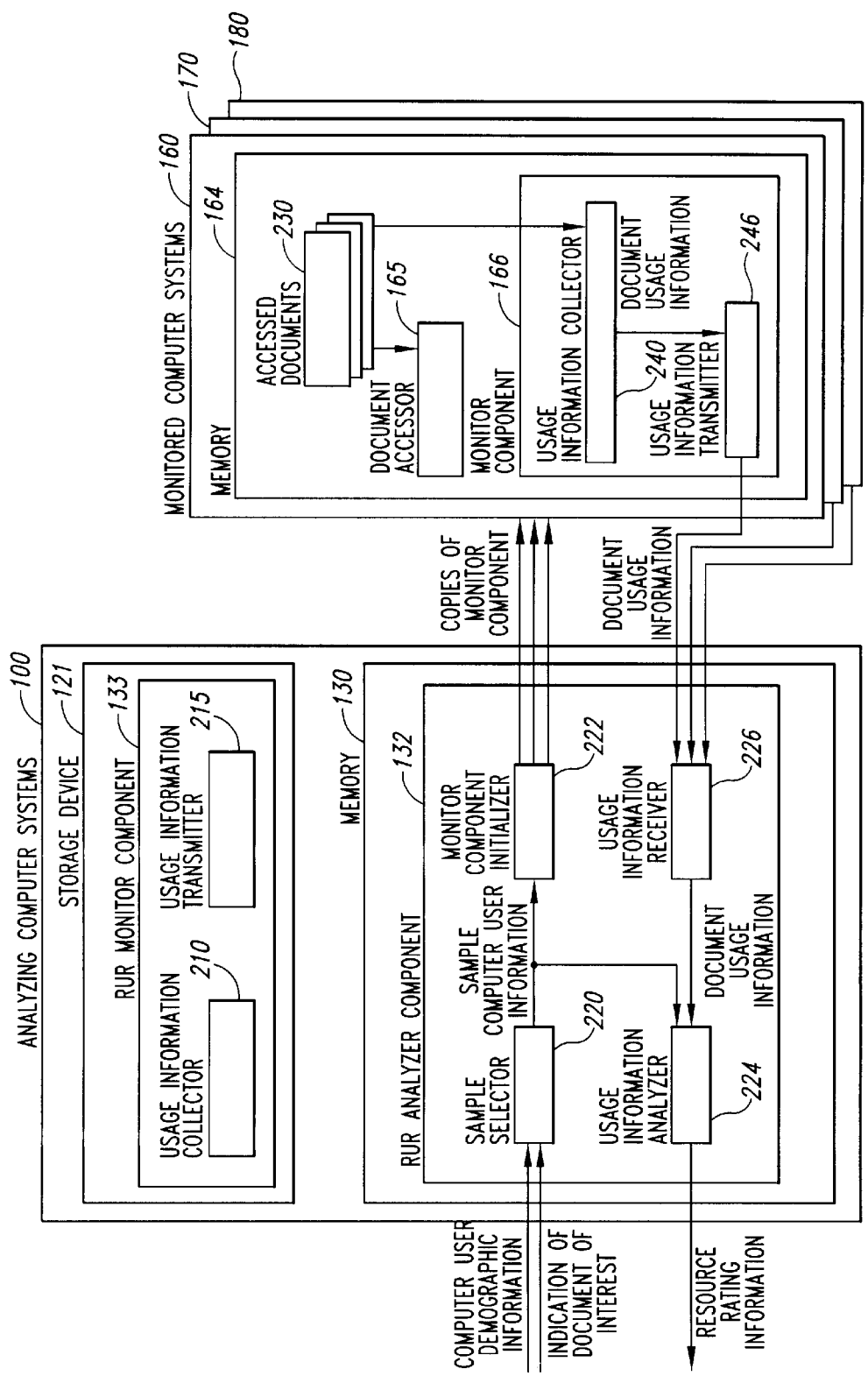
FIG. 2 is a block diagram illustrating the contents and information flow of a Resource Usage Rater system.

FIG. 2 is a block diagram illustrating the contents and an example information flow of the RUR system. FIG. 2 includes computer systems 100, 160, 170, and 180. The RUR system includes a Monitor Component 133 stored on the storage device 121, and an executing copy of the Analyzer Component 132 in memory 130. The Monitor Component 133 includes a Usage Information Collector 210 and a Usage Information Transmitter 215. The Analyzer Component 132 includes a Sample Selector 220, a Monitor Component Initializer 222, a Usage Information Analyzer 224, and a Usage Information Receiver 226. Those skilled in the art will appreciate that analyzing computer system 100 may include additional components that are not illustrated in FIG. 2.

The RUR system receives input indicating computer system resources of interest and computer user information, including demographic information, about users that have access to the resources. Various methods for gathering or obtaining demographic information about users are known in the art (e.g., accessing a previously constructed customer database or purchasing a commercially-available list of user information). After the computer user information is received, it is forwarded to the Sample Selector 220. The Sample Selector 220 reviews the received computer user information, and selects a sample group of computer users that will be representative of all users who have access to the computer system resources of interest. For example, if it is useful to know how users of different genders and ages interact with documents of interest, then age and gender are relevant types of user information that will be used to select sample users. Sample users could be chosen from subgroups of the computer users, such as women age 0–20, women age 21–40, and women age 41–100. The chosen sample users from a subgroup will represent the other computer users in that subgroup who are not chosen as sample users. Those skilled in the art will appreciate that a variety of methods for choosing a representative sample group from a larger group are known in the art, many of which use demographic information of various types.

The Sample Selector 220 then forwards the computer user information for the sample users to the Monitor Component Initializer 222 and the Usage Information Analyzer 224. The Monitor Component Initializer 222 uses the computer user information to determine which computer system is used by each of the sample users, and transfers a copy of the Monitor Component 133 software (from the stored copy on storage device 121) to the computer systems of each sample user. The copies may be transmitted in a variety of ways, including via a network connection or a computer-readable medium. Moreover, a copy can be transferred directly into the RAM of the receiving computer system, or it can be stored on a storage device to await execution.

In the illustrated embodiment, the users of monitored computer systems 160, 170 and 180 are chosen as the sample users. Correspondingly, the memory 164 of monitored computer system 160 contains an executing copy of a Monitor Component 166 that has been transferred by the Monitor Component Initializer 222. The memory 164 also contains an executing document accessor 165, and multiple accessed documents 230. The accessed documents 230 may have been loaded into memory from storage on monitored computer system 160 or from any other computer system with which monitored computer system 160 can communicate, such as the server computer system 150 (not displayed here). Those skilled in the art will appreciate that monitored computer systems 160, 170, and 180 may include additional components that are not illustrated in FIG. 2.

The copies of the Monitor Component software are loaded into memory on the sample users' computer systems and executed prior to the resource usage that will be monitored. The Monitor Component 166 is such an executing copy, and it comprises a Usage Information Collector 240 and a Usage Information Transmitter 246. As the Monitor Component 166 program executes on monitored computer system 160, the Usage Information Collector 240 monitors activities of the user of system, and detects when the user is accessing a computer system resource. The particular type and duration of resource usage is noted and recorded, and this information is forwarded to the Usage Information Transmitter 246. In the illustrated embodiment, sample users access computer document resources such as accessed documents 230 using a document accessor program such as document accessor 165, and engage in a variety of interactions with the accessed documents.

The Usage Information Transmitter 246 receives resource usage information (in this illustrated embodiment, document usage information) from the Usage Information Collector 240, and transmits the usage information to the executing Analyzer Component 132 on analyzing computer system 100. Transmitted information is received by the Usage Information Receiver 226, which forwards the received usage information to the Usage Information Analyzer 224. The Usage Information Analyzer 224 uses standard sampling techniques to estimate the total use of computer system resources of interest (e.g., accessed documents 230) by all users with access to those computer system resources, using the usage information from multiple sample users and the sample computer user information as input. Finally, the Usage Information Analyzer 224 rates the various resources based on the total usage information, and makes this rating information available to other components.

A resource is typically rated relative to some type of usage activity of interest. For example, an advertiser may rate a location where advertisements are displayed based on the number of people who view the location, the amount of viewing time, the income level of people who view, or additional activities taken by viewers (e.g., requesting additional information). If the advertisement is located in a webpage or on a website, the location could be rated on the basis of advertising factors such as those mentioned. Those skilled in the art will appreciate that usage information used for rating can be gathered in a variety of ways, and that it is not necessary for all information to be returned to a single central facility. In particular, if more than one computer is assisting in providing access or use of a computer resource (e.g., a personal computer user who connects to an on-line service provider computer in order to access other computers), any of these computers may be able to sufficiently monitor the usage activities of the user. Those skilled in the art will also appreciate that a variety of methods are known in the art for estimating total usage of a resource from the usage of representative sample users, and for rating resources.

Analyzer Component

FIG. 3 is a flow diagram for an implementation of the Sample Selector routine 300. The routine executes as part of the Analyzer Component, receiving information about a computer resource of interest and a group of computer users with access to a resource. The routine then selects a sample subgroup of the users that will be representative of the larger group, and forwards information about the sample users to other components. In one embodiment, described in FIGS. 3–10, the resources are computer documents that can be located on a variety of computer systems or storage devices. The Sample Selector routine begins in step 305, where the routine receives an indication of computer documents of interest. In step 310, the routine receives information about computer users with access to the computer documents. This information typically includes demographic information, such as age, sex, race, religion, occupation, income, hobbies, etc. In step 315, the routine determines the types of user information that are relevant to the activities being monitored, typically basing the determination on various demographic traits. For example, if it is useful to know how users of different genders and ages interact with the documents of interest, then age and gender are relevant types of user information. The relevant user information will be used to select sample users. In step 325, the routine selects a sample group of computer users based on their demographic information in such a way that the selected users provide a representative sample for the types of information determined to be relevant. For example, sample users could be chosen from subgroups of the computer users, such as women age 0–20, women age 21–40, and women age 41–100. The chosen sample users from a subgroup will represent the other computer users in that subgroup who are not chosen as sample users. Those skilled in the art will appreciate that sampling techniques are well-known, and that a variety of types of demographic information can be used. Finally, the routine in step 330 forwards the received user information for the sample users to the Monitor Component Initializer routine and Usage Information Analyzer routine of the Analyzer Component. In step 335, the routine ends. Those skilled in the art will appreciate that this routine can be invoked multiple times to select sample users for other resources, for additional computer users, or for different types of relevant information.

FIG. 4 is an implementation of the Monitor Component Initializer routine 400. The routine executes as part of the Analyzer Component, and for each sample user it identifies the computer system used by the user and loads a copy of the stored Monitor Component software onto the user's computer. The routine begins in step 405, where it receives user information about the sample users from the Sample Selector routine. In step 410, the routine selects a sample user, beginning with the first user. In step 415, the routine determines the computer system used by the selected sample computer user, and in step 420 the routine sends a copy of the Monitor Component software to the sample user's computer. Those skilled in the art will appreciate that the computer system used by a sample user can be determined in a variety of ways, including through the previously received user information or through a database containing computer information. In addition, the copy of the Monitor Component software can be sent to a sample user's computer in a variety of ways, including by transmitting the software over a computer network. Alternately, the Monitor Component software could have been previously loaded onto the computer, and the routine could merely activate the software or prepare it for execution. In step 425, the routine determines if there are more sample users, and if so it returns to step 410 to select the next sample user. If there are not more sample users, the routine ends at step 430.

Figures 5, 6:
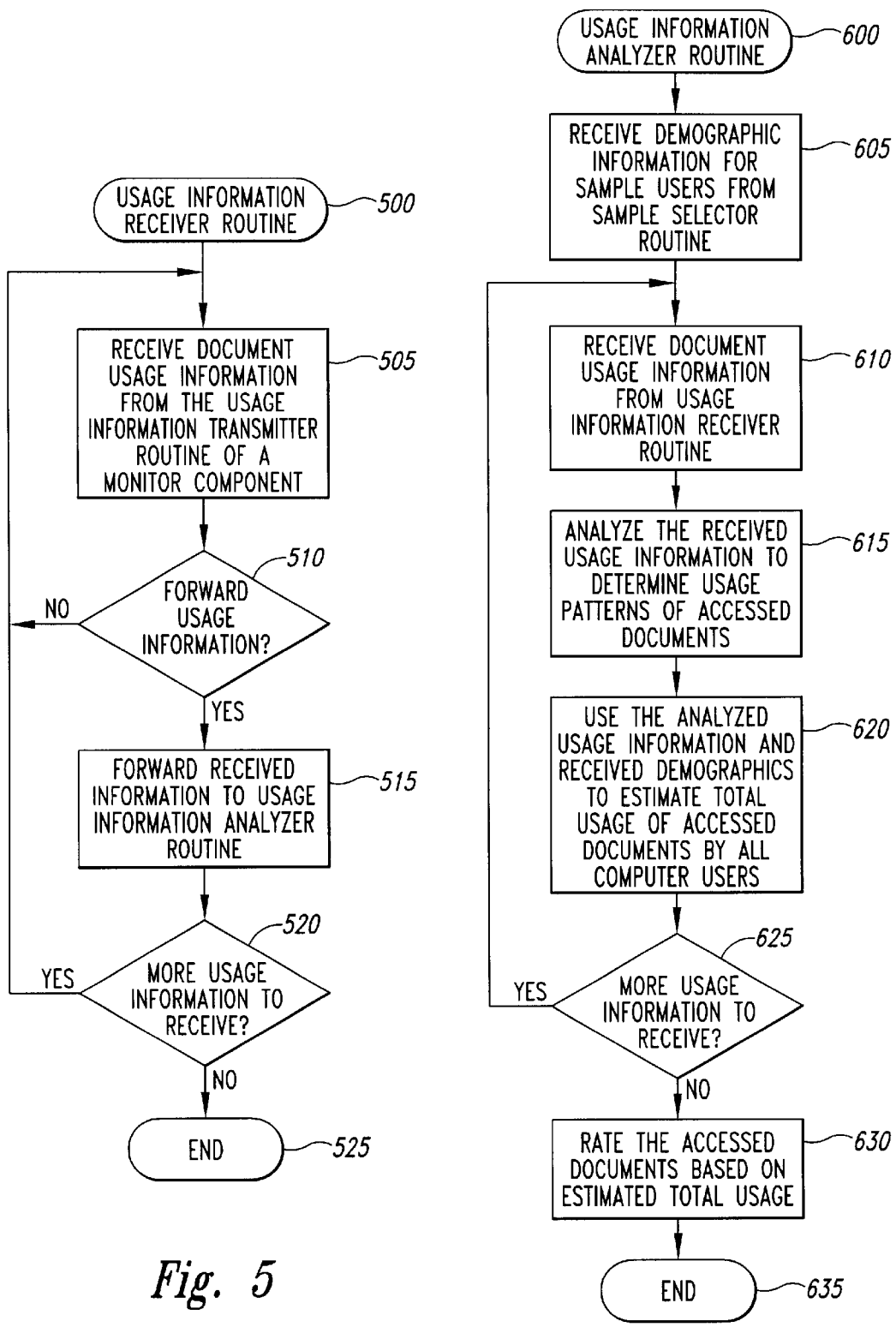
FIG. 5 is a flow diagram of a possible implementation of a Usage Information Receiver routine.
FIG. 6 is a flow diagram of a possible implementation of a Usage Information Analyzer routine.

FIG. 5 is a flow diagram of an implementation of the Usage Information Receiver routine 500. The routine executes as part of an Analyzer Component, where it receives document usage information from multiple Monitor Components on sample users' computers and occasionally forwards the information to the Usage Information Analyzer routine. The routine begins at step 505 where it receives document usage information from a Usage Information Transmitter routine of a Monitor Component. This usage information corresponds to the sample user using the computer system that is being monitored by the Monitor Component. The routine then determines in step 510 whether it should forward accumulated usage information that it has received to the Usage Information Analyzer routine. If not, the routine returns to step 505 and continues to accumulate usage information. If so, the routine continues to step 510 where its forwards the accumulated usage information to the Usage Information Analyzer routine. The routine then determines in step 520 if there is more usage information to receive, and if so returns to step 505 to begin to accumulate more usage information. If not, the routine exits in step 525. Those skilled in the art will appreciate that the received information could be forwarded at a variety of times, such as when it is first received, after a certain time delay, or only after a sufficient amount of information has accumulated.

FIG. 6 is a flow diagram of an implementation of the Usage Information Analyzer Routine 600. The routine executes as part of an Analyzer Component, and uses the document usage information received by the Analyzer Component and the user information for the representative sample users to estimate the total usage of the documents by all users with access to them. The routine begins at step 605, where the routine receives user information about the sample computer users from the Sample Selector routine. In step 610, the routine receives document usage information from the Usage Information Receiver routine. In step 615, the received document usage information is analyzed to determine the usage patterns of the documents of interest. In step 620, the routine uses the determined usage patterns and the sample user information to estimate the total usage of the documents of interest by all computer users with access to the documents. Those skilled in the art will appreciate that a variety of sampling methods are known in the art, including methods of using sampled information to estimate information for an entire group that is being represented by a smaller sample group. The routine then determines in step 625 if there is more usage information to receive, and if so, returns to step 610 to receive more usage information. If not, the routine continues to step 630 where it rates the documents of interest based on their estimated total usage. The documents can be rated independently, or can be rated relative to other documents or other possible substitutes for the role being played by the document. For example, if a document includes advertising information and is being monitored to detect how many users interact with the advertising information and in what manner the interaction takes place, the document could be rated relative to other types of advertising media (ie., radio, TV, or newspapers). Finally, the routine ends in step 635.

Monitor Component

Figure 7:
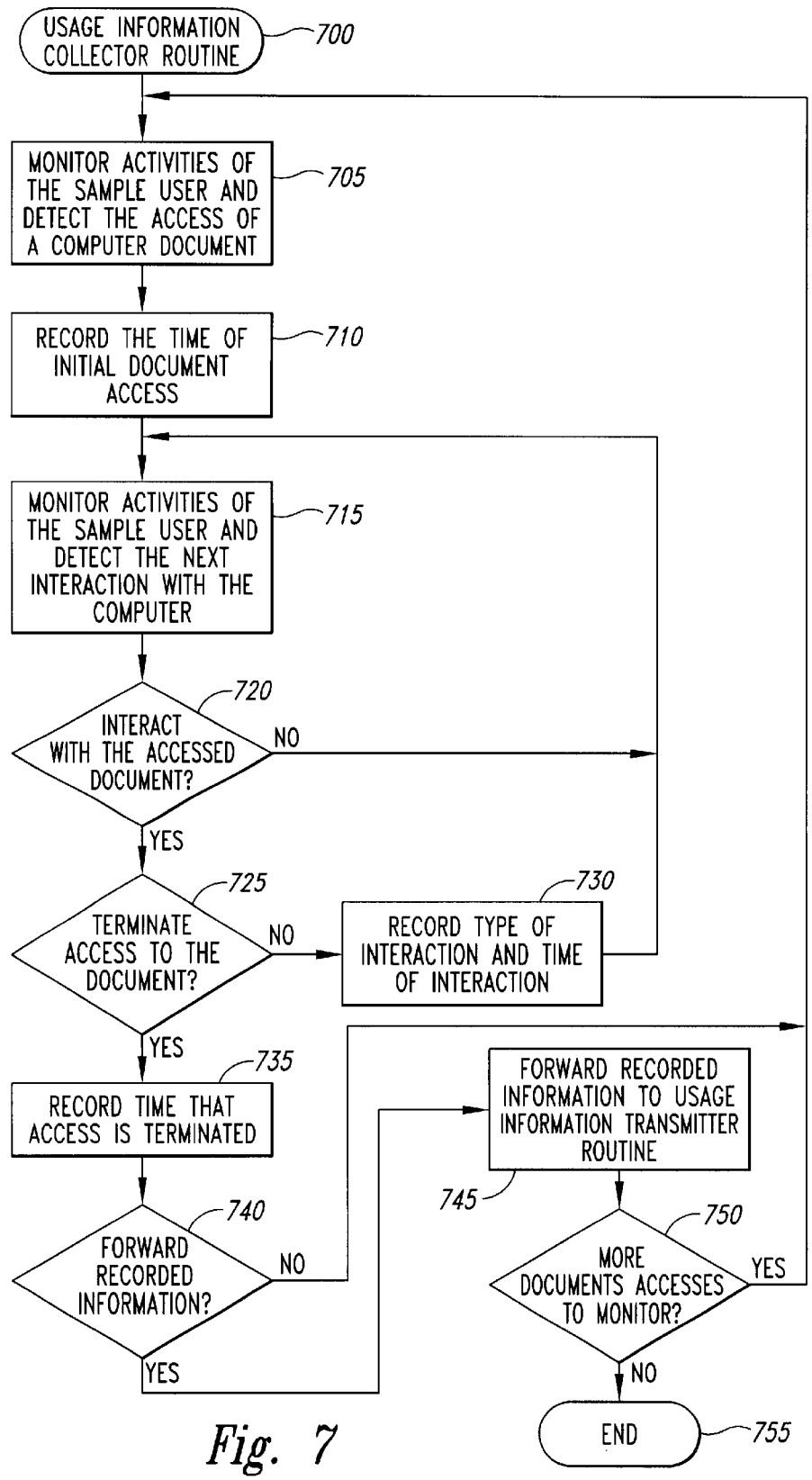
FIG. 7 is a flow diagram of a possible implementation of a Usage Information Collector routine.

FIG. 7 is a flow diagram of an implementation of the Usage Information Collector routine 700. The routine executes as part of a Monitor Component on a sample user's computer, where it monitors the usage of documents (both local documents on the computer system itself and remote documents on other computer systems) by the sample user and records the time and type of various interactions with accessed documents. In steps 705–740 the routine loops, detecting a period of access of a computer document and recording usage information about that document. The routine begins in step 705, where it monitors the activities of the sample user and detects the beginning of a period of access of a computer document. In step 710, the routine records the time of initial document access. In steps 715–730 the routine loops, recording usage information for a document that has been accessed. In step 715, the routine detects the next interaction by the sample user with the computer. In step 720, the routine determines if the detected computer interaction involves an interaction with the accessed document, and if not, the routine returns to step 715 to detect the next interaction. If the interaction does relate to the accessed document, the routine continues to step 725 where it determines if the period of access with the document has been terminated. If not, the routine continues to step 730, where it records the type and time of the interaction, and then continues to step 715 to detect the next interaction. If access to the document is terminated in step 725, the routine continues to step 735 where it records the time that document access is terminated. The routine then continues to step 740, where it determines if the recorded usage information should be forwarded to an Analyzer Component. If not, the routine returns to step 705 to detect the access of the next computer document by the sample user, and if so, the routine proceeds to step 745 where it forwards the recorded information to the Usage Information Transmitter routine of an Analyzer Component. In step 750 the routine determines if there are more document accesses to monitor, and if so the routine returns to step 705 to detect the next access. If not, the routine ends at step 755. Those skilled in the art will appreciate that a variety of types of usage information can be collected (e.g., viewing text or executing embedded programs), that the interactions of a user can be monitored and recorded in a variety of ways (e.g., monitor all input from computer system input devices), and that the monitored information could be forwarded at a variety of times.

Figure 8:
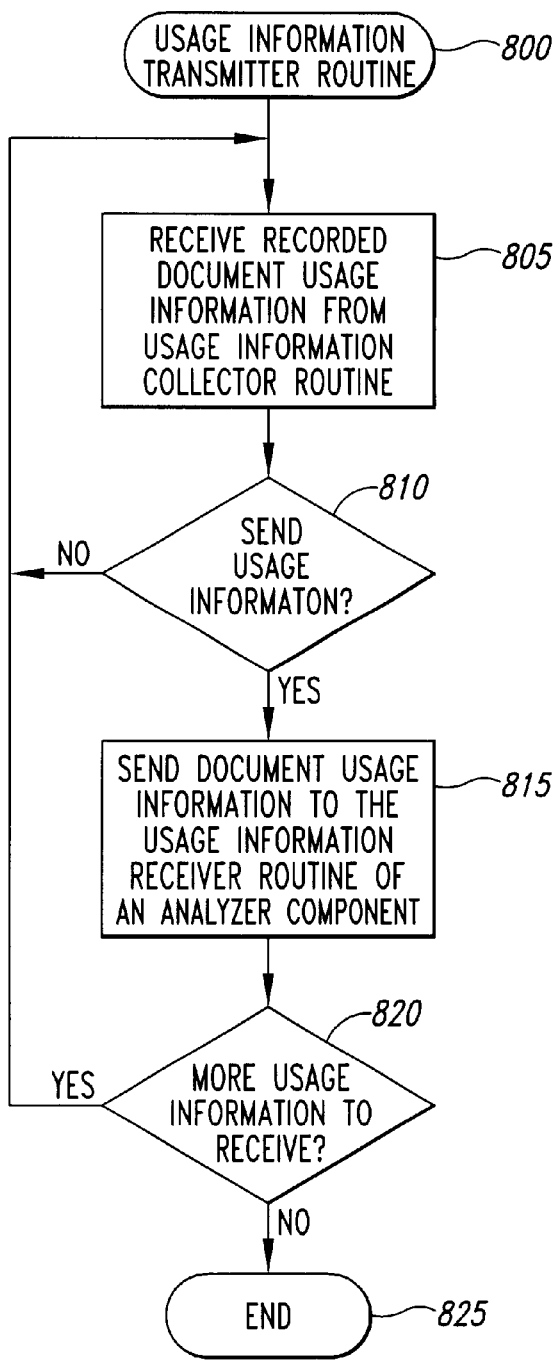
FIG. 8 is a flow diagram of a possible implementation of a Usage Information Transmitter routine.

FIG. 8 is a flow diagram of an implementation of the Usage Information Transmitter routine 800. The routine executes as part of a Monitor Component on a sample user's computer, where it receives recorded document usage information and occasionally forwards the information to an Analyzer Component. Typically, the information will be sent to the Analyzer Component responsible for initiating the execution or transfer of the Monitor Component routine to the sample user's computer. The routine begins in step 805, where it receives recorded document usage information from the Usage Information Collector routine. In step 810 the routine determines if the received usage information that has accumulated should be sent to an Analyzer Component. If so, the routine sends the accumulated usage information to a central Analyzer Component, and continues to step 820 to determine if there is more usage information to receive. If there is more usage information to receive, the routine returns to step 805 and begins to receive and accumulate more usage information. If the routine determined not to send the accumulated usage information in step 810, it returns to step 805 and continues to accumulate usage information. Those skilled in the art will appreciate that the received information could be sent to an Analyzer Component in a variety of ways (e.g., transmitted over a computer network) and at a variety of times (e.g., when it is first received, after a certain time delay, or only after a sufficient amount of information has accumulated)

EXAMPLES

Figure 9:
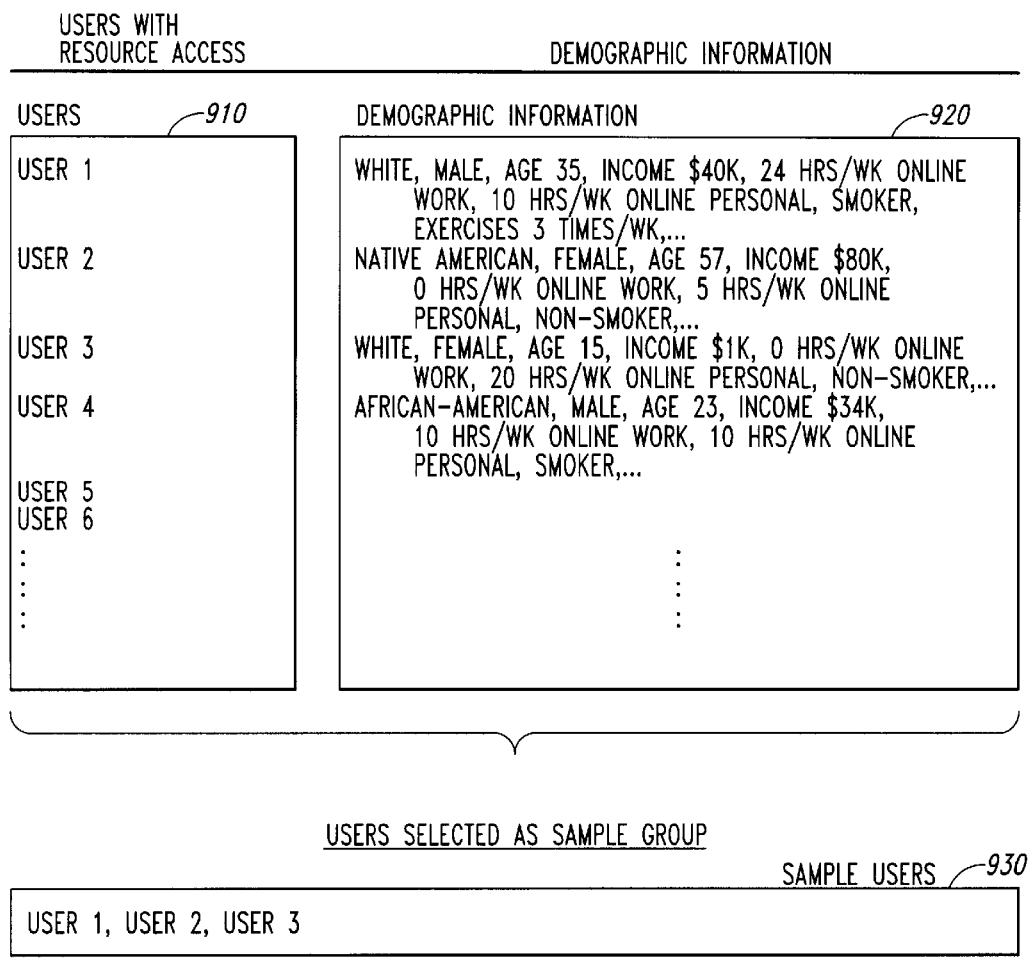
FIG. 9 is a diagram illustrating examples of users and their demographic information, and the selection of a sample group of the users.

FIG. 9 is a diagram illustrating examples of computer users along with their demographic information, and the selection of a sample group of those computer users. FIG. 9 includes users 910, demographic information 920, and sample users 930. Users 910 is a list of multiple computer users with access to a resource of interest, with users 1–6 displayed. Demographic information 920 includes demographic information that corresponds to the users in users 910. For example, the first two lines of information in demographic information 920 correspond to the first user in users 910, user 1. Thus, user 1 is a white male, age 35, income $40K per year, who spends 24 hours per week online for work purposes, 10 hours per week online for personal purposes, is a smoker, exercises 3 times per week, etc. Similarly, user 2 is a Native American female, age 57, with an income of $80K per year, who spends 0 hours per week online for work purposes, but 5 hours per week online for personal purposes, etc. Sample users 930 is comprised of user 1, user 2, and user 3, indicating that these three users have been selected as a sample group of users that are representative of all users in users 910.

Those skilled in the art will appreciate that other types of demographic information could be used, and that a sample group could be selected in a variety of ways. For example, consider a situation where there are 30 users in users 910 that represent all of the computer users with access to some resource of interest, such as a particular computer document. The 30 users have a variety of diverse types of demographic information, but it is determined that the only type of demographic information that is relevant in this situation is whether the users are smokers or not. Of the 30 users, 20 are non-smokers and 10 are smokers. Typically, the relevant types of demographic information will be chosen based on factors that are correlated with the activity being estimated, which here is usage of the document. For example, if older people generally access and use documents more frequently than younger people, then age should be a relevant factor—if it was not, then an older person might be chosen to represent a group of primarily younger people. When the older representative's usage is used to estimate the usage of all the people in the group, the estimate would be likely to be higher than the actual usage.

Thus, the selection of only smoking status as a relevant factor indicates that it is the only factor correlated with accessing this document. For example, the document may be related to an announcement of a smoking convention, and the likelihood of someone attending the conference (and reading the announcement information) depends only on smoking status. This would typically indicate that the document is accessed and used in the same manner by users of all ages, incomes, races, etc., with only smoking status being a differentiating factor. Moreover, the convention organizers may wish to know the number of smokers and non-smokers who may be considering attending, and may wish to estimate this number based on the number of people who select an option in the document to view registration information. In this scenario, the representative sample users could be chosen in a number of ways. For example, two non-smokers and one smoker could be chosen, and their usage of the document could be increased by ten to estimate the usage by the other users. Alternatively, one smoker and one non-smoker could be chosen, and the smoker's usage could be increased by ten and the non-smoker's usage could be increased by twenty. Another alternative would be to select and monitor the activities of all thirty users, but typically a subgroup of a larger group is chosen for efficiency purposes.

FIG. 10 is a diagram illustrating usage information for resources that are accessed, and an estimation of the total resource usage by all users of the resources. FIG. 10 includes two resources, those being document 1010 and program 1040, two sets of usage information, those being usage information 1020 and 1050, two user lists, those being user lists 1030 and 1060, and total usage estimation 1070. Document 1010 is a document comprised primarily of text, but which also includes an image in the document corresponding to a press photo. Usage information 1020 and user list 1030 provide usage information and user identities, respectively, which correspond to the usage of document 1010. For example, document 1010 was accessed on 8/17 from 10:50–11:30 AM by user 1 who opened, viewed and closed the document. In a similar manner, document 1010 was accessed again on 8/17 from 8:30–8:55 PM by user 2 who opened, viewed and closed the document; on 8/18 by user 4 from 2:15–2:25 PM who also opened, viewed and closed; on 8/19 by user 1 from 4:05–5:35 PM and user 3 from 4:30–4:45 PM, who both opened, viewed and closed; and by user 2 from 8:10–8:35 PM who opened the document, displayed the image, and closed the document. Program 1040 is an executable software program entitled "Dune Buggy Racer," and usage information 1050 and user list 1060 correspond to program 1040. These indicate that program 1040 was accessed by user 3 who executed the program on 8/17 from 9:30–10:45 AM.

After combining the usage information for all the sample users, an estimate of the total resource usage of document 1010 and program 1040 is shown at the bottom of FIG. 10 in total usage estimation 1070. Note that even though usage information for user 4 was present in usage information 1020, this information will not be used in the total usage estimation because user 4 was not a member of the sample group of users 930. The total resource usage estimation 1070 shows that document 1010 was actually viewed by user 1 for 130 minutes, by user two for 25 minutes, and by user 3 for 15 minutes. In addition, the image in document 1010 was displayed by user 2 for 2 minutes, but not by user 1 or user 3. Since document 1010 did not include an executable program, none of the sample users spent any time executing a program.

In addition to the actual usage times, extrapolated usage times are included in total usage estimation 1070 indicate an estimate of the total usage of document 1010 for all users represented by each of the sample users. For example, the extrapolated value for the actual 130 minutes of user 1 view time is 260 minutes. Similarly, the extrapolated view value for user 2 is 25 minutes and for user 3 is 5 minutes. Those skilled in the art will appreciate that various sampling techniques are known, and that the estimation or extrapolation to the total usage of all users can be conducted in a variety of ways. For example, the extrapolated view value for user 1 may have been calculated as follows. A sampling technique determined that for the characteristic of viewing a document, the only relevant type of information is age, and the users were broken up into demographic groups of people ages 0–20, ages 21–40 and ages 41 and up. In this case, there may have been an estimate of two total users in the age range of 21–40 and only one sample user for that age range, sample user 1. Thus, the actual viewing time of user 1 is doubled as an estimate of the time that user 1 and the other user in this age range would together spend viewing document 1010. Alternately, the extrapolated viewing times could indicate that user 1 represented 6 people, that user 2 represented 3 people, and that user 3 represented 1 person, and that the estimated usage period was only ⅓ as long as the actual time.

Other extrapolated values were estimated in a similar manner, and they show that relationships other than modifying the actual time by a multiplicative factor are possible. For example, the extrapolated value of 10 minutes for the Display Image attribute could reflect a calculation of (actual*2)+10. In addition, the only actual time spent using program 1040 involved 75 minutes of execute time by user 3, but the extrapolated values include 150 minutes of execute time by user 3 and 25 minutes of execute time by user 2, giving a total extrapolated execute time of 175 minutes. In this situation, actual time of 0 minutes for user 2 was extrapolated to 25 minutes because this group may always have a single access period of 25 minutes by one of its users, accompanied by intermittent use by other users. Thus, the group represented by user 2 will always have a minimum of 25 minutes of execute time. Those skilled in the art will appreciate that these characteristics and values are shown for illustrative purposes only, and do not limit the present invention.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method in a computer system for estimating usage of a specified computer resource that is used by multiple users, the method comprising:

identifying a first group of users using computers having access to the specified computer resource;

receiving demographic information about the first group of users;

selecting some of the first group of users to be a second group of users that is an approximately representative sample of the first group of users based on the received demographic information;

for each user of the second group of users, identifying a user's computer used by the user of the second group; and notifying the user's computer to initiate monitoring of usage of the specified computer resource by the user of the second group and to send information about the monitored usage by the user of the second group to the computer system; and estimating the total usage of the specified computer resource by the first group of users based on the information about the monitored usage by the second group of users and the received demographic information about the first group of users.

2. The method of claim 1 wherein the specified computer resource is a document.

3. The method of claim 2 wherein usage of the document by a user includes displaying of advertising information to the user and wherein monitoring usage of the document by the user includes monitoring interactions of the user with the displayed advertising information, so that the estimated total usage of the document can be used to determine an appropriate fee for displaying the advertising information when the document is used.

4. The method of claim 2 wherein the monitored usage is viewing of the document.

5. The method of claim 2 wherein the document is a computer webpage.

6. The method of claim 1 wherein notifying the user's computer includes providing a copy of a monitoring component to the user's computer, wherein the provided monitoring component copy monitors usage of the specified computer resource by the selected user and sends information about the monitored usage to the computer system.

7. A computer-based method for estimating total usage of a computer resource by a group of client computer systems with access to the computer resource, the method comprising:

identifying a first subset of the group of client computer systems that is an approximately representative sample of the group of client computer systems;

for each client computer system of the first subset, initiating execution of a monitoring program on the client computer system; and under control of the executing monitoring program, collecting information about usage of the computer resource by the client computer system; and estimating the total usage of the computer resource by the group of client computer systems based on the collected information.

8. The method of claim 7 wherein initiating execution of a monitoring program includes loading a copy of the monitoring program onto the client computer system prior to execution.

9. The method of claim 7 wherein each executing monitoring program controls the collection of information about usage of a plurality of computer system resources.

10. The method of claim 7 wherein usage of the computer resource by the first subset of the group of client computer systems is at the direction of users, wherein the first subset of the group of client computer systems is identified based on demographic information describing the users, and wherein the estimating of the total usage of the computer resource is based on the demographic information.

11. The method of claim 7 wherein the computer resource is a computer document that is accessible to computer systems via a computer network.

12. A method for estimating total usage of a computer resource that is used by multiple users, the method comprising:

selecting a computer resource;
identifying a first group of users with access to the selected computer resource;
selecting a second group of users as an approximately representative sample of the first group of users based on information describing the first group of users;
for each user of the second group of users,
initiating execution of a monitoring component on a computer used by the user of the second group; and
under control of the executing monitoring component, monitoring usage of the selected computer resource by the user of the second group; and
under control of an analyzing component,
receiving information related to the monitored usage of the selected computer resource by the second group of users; and
estimating usage of the selected computer resource by other users of the first group who are not users of the second group based on the received monitored usage information and the information describing the first group of users.

13. The method of claim 12 wherein information about usage of a second resource is received, and including the step of rating the usage of the selected computer resource relative to the usage of the second resource based on the estimated usage information for the selected computer resource and the received usage information for the second resource.

14. The method of claim 13 wherein the selected computer resource is a computer document, wherein the usage of the selected computer resource includes interactive usage, wherein the usage of the second resource does not include interactive usage, and wherein the usage rating of the computer document reflects the interactive usage.

15. The method of claim 12 wherein usage of the selected computer resource by a user of the second group prompts availability of additional information to the user of the second group, wherein the monitoring includes monitoring interactions of the user of the second group with the additional information, and wherein the estimated usage includes estimates of interactions with the additional information by other users of the first group who are not users of the second group.

16. The method of claim 15 wherein the additional information is advertising information for a product other than the selected computer resource and wherein the interactions with the additional information include viewing the additional information, and including the step of determining based on the estimated usage an appropriate fee for making information available when the selected computer resource is used.

17. A computer system for estimating total usage of a computer resource that is used by a group of computer systems, comprising:
a monitoring component that executes on a member computer system of the group of computer systems and monitors usage of a specified computer resource by the member computer system; and
an analyzer component that identifies a subset of the group of computer systems with access to the specified computer resource, that initiates execution of a monitoring component on each of the computer systems of the subset, that receives monitored usage information from the computer systems of the subset, and that estimates total usage of the specified computer resource by the group of computer systems based on the received monitored usage information of the subset.

18. The computer system of claim 17 wherein the identified computer systems of the subset use a plurality of computer system resources, wherein the analyzer component loads the monitoring component onto each identified computer system prior to the initiating of execution, and wherein each monitoring component executing on each identified computer system monitors usage by the identified computer system of a plurality of computer system resources and sends information about the monitored usage to the analyzer component.

19. The computer system of claim 17 wherein the identified computer systems of the subset use the specified computer resource at the direction of users, wherein the analyzer component receives demographic information about the users and selects some of the users as an approximately representative sample of the group of computer systems based on the received user information, and wherein the analyzer component estimates the total usage of the specified computer resource by the group of computer systems by using monitored usage information received only from the subset of identified computer systems with selected users.

20. The computer system of claim 17 wherein the specified computer resource is a computer document that is accessible to other computer systems via a computer network.

21. A computer system for estimating usage of a computer resource that is used by multiple users, comprising:
a monitoring component that executes on a computer and monitors usage of a computer resource by a user of the computer; and
an analyzer component that selects a computer resource, that receives information about a plurality of users with access to the selected computer resource, that uses the received user information to select a subset of the plurality of users as an approximately representative sample of the plurality of users, that for each user of the subset initiates execution of a monitoring component on a computer used by the user of the subset, that receives monitored usage information from executing monitoring components, and that uses the received monitored usage information and the received user information to estimate usage of the selected computer resource by other users of the plurality of users who are not users of the subset.

22. The computer system of claim 21 wherein the analyzer component receives information about usage of a second resource, wherein the usage of the second resource is of a different type than the usage of the selected computer resource, and wherein the analyzer component rates the usage of the selected computer resource relative to the usage of the second resource based on the estimated usage information for the selected computer resource and the received usage information for the second resource.

23. The computer system of claim 22 wherein the selected computer resource is a computer document, wherein the type of usage of the selected computer resource includes interactive usage, and wherein the type of usage of the second resource includes only viewing.

24. The computer system of claim 21 wherein usage of a computer resource by a user prompts a display to the user of information unrelated to the computer resource, wherein the monitoring includes monitoring interactions of the user with the displayed information, and wherein the estimated usage includes estimates of interactions with information whose display was prompted by the usage of the selected computer resource.

25. The computer system of claim 24 wherein the displayed information is advertising information for a product other than the selected computer resource and wherein the estimated interactions are used to determine an appropriate fee for displaying information upon usage of the selected computer resource.

26. A computer-readable medium containing instructions for controlling a computer system to estimate total usage of a computer resource that is used by a plurality of computer systems, by:

identifying a subset of client computer systems with access to a computer resource, the subset being an approximately representative sample of the plurality of computer systems;

for each of the identified client computer systems of the subset, initiating execution of a monitoring program on the identified client computer system; and under control of the executing monitoring program, monitoring usage of the computer resource by the identified client computer system; and estimating the total usage of the computer resource by the plurality of client computer systems based on the monitored usage information of the subset.

27. The computer-readable medium of claim 26 wherein at least some of the subset of identified computer systems use a plurality of computer system resources, wherein the initiating execution includes loading a copy of the monitoring program onto the identified computer system and initiating execution of the loaded copy, and wherein each loaded monitoring program copy executing on the at least some of the subset monitors usage by the system of a plurality of computer system resources and sends information about the monitored usage to the computer system.

28. The computer readable medium of claim 26 wherein at least some of the subset of identified computer systems use the computer resource at the direction of users, wherein demographic information about the users is received and some of the users are selected based on the received user information, and wherein the estimating uses monitored usage information only from the identified computer systems with selected users.

29. The computer-readable medium of claim 26 wherein the computer resource is a computer documents that is accessible to computer systems vis a computer network.

30. A computer-readable medium containing instructions for controlling a computer system to estimate total usage of a computer resource that is used by multiple users, by:

selecting a computer resource;

identifying a first group of users with access to the selected computer resource;

selecting a second group of users as an approximately representative sample of the first group of users based on information describing the first group of users;

for each user of the second group of users, initiating execution of a monitoring component on a computer used by the user of the second group; and under control of the executing monitoring component, monitoring usage of computer resources by the user of the second group; and under control of an analyzing component, receiving information related to the monitored usage of computer resources by the second group of users; and estimating the total usage of the selected computer resource by the first group of users based on the received monitored usage information and the information describing the first group of users.

31. The computer-readable medium of claim 30 wherein information about usage of a second resource is received, wherein the usage of the second resource is of a different type than the usage of the selected computer resource, and including the step of rating the usage of the selected computer resource relative to the usage of the second resource based on the estimated usage information for the selected computer resource and the received usage information for the second resource.

32. The computer-readable medium of claim 31 wherein the selected computer resource is a computer document, wherein the type of usage of the selected computer resource includes interactive usage, and wherein the type of usage of the second resource does not include interactive usage.

33. The computer-readable medium of claim 30 wherein usage of the selected computer resource by a user of the second group prompts availability of additional information to the user of the second group, wherein the monitoring includes monitoring interactions of the user of the second group with the additional information, and wherein the estimated usage includes estimates of interactions with the additional information whose availability was prompted by the usage of the selected computer resource.

34. The computer-readable medium of claim 33 wherein the available information is advertising information for a product other than the selected computer resource and wherein the interactions with the available information include viewing the information, whereby the estimated interactions can be used to determine an appropriate fee for making information available upon usage of the selected computer resource.

* * * * *